United States Patent
Miskiewicz et al.

(10) Patent No.: US 10,543,901 B2
(45) Date of Patent: Jan. 28, 2020

(54) SYSTEM AND METHOD FOR CONTROLLING PROPELLER PITCH

(71) Applicant: General Electric Company, Schenectady, NY (US)

(72) Inventors: Krzysztof Miskiewicz, Warsaw (PL); Aleksander Krzysztof Szymandera, Warsaw (PL); Piotr Szymanski, Warsaw (PL); Adam Przadka, Warsaw (PL)

(73) Assignee: General Electric Company, Schenectady, NY (US)

( * ) Notice: Subject to any disclaimer, the term of this patent is extended or adjusted under 35 U.S.C. 154(b) by 599 days.

(21) Appl. No.: 15/251,294

(22) Filed: Aug. 30, 2016

(65) Prior Publication Data

US 2017/0066524 A1 Mar. 9, 2017

(30) Foreign Application Priority Data

Sep. 7, 2015 (PL) .......................................... 413811

(51) Int. Cl.
*B64C 11/30* (2006.01)
*B64C 11/40* (2006.01)
(Continued)

(52) U.S. Cl.
CPC ............ *B64C 11/40* (2013.01); *B64C 11/306* (2013.01); *B64C 11/48* (2013.01); *B64D 27/10* (2013.01);
(Continued)

(58) Field of Classification Search
CPC ....... B64C 11/40; B64C 11/306; B64C 11/38; B64C 11/48; B64C 27/10; F02C 3/04; F02C 6/20; F04D 29/362; F01D 7/00
See application file for complete search history.

(56) References Cited

U.S. PATENT DOCUMENTS

| 3,096,043 A | 7/1963 | Labussiere |
| 3,261,405 A | 7/1966 | Andrews, Jr. |

(Continued)

FOREIGN PATENT DOCUMENTS

| EP | 1881176 A2 | 4/1990 |
| EP | 0363997 A2 | 1/2008 |

(Continued)

OTHER PUBLICATIONS

Poland Search Report issued in connection with Corresponding PL Application No. 413811 dated Nov. 15, 2016.
(Continued)

*Primary Examiner* — Woody A Lee, Jr.
*Assistant Examiner* — Sabbir Hasan
(74) *Attorney, Agent, or Firm* — Dority & Manning, P.A.

(57) ABSTRACT

Systems and methods are disclosed for controlling the pitch angle of a propeller and rotor assembly that selectively limit the pitch angle according to a selected mode of operation. The system comprises a fine stop collar defining a primary channel, an oil transfer bearing (OTB) extending across the fine stop collar, and an actuator piston engaged with a propeller blade crankshaft to vary propeller blade pitch, wherein the annular piston is positioned about the OTB in fluid communication with the primary channel.

20 Claims, 5 Drawing Sheets

(51) Int. Cl.
  *B64C 11/48* (2006.01)
  *B64D 27/10* (2006.01)
  *F02C 3/04* (2006.01)
  *F02C 6/20* (2006.01)

(52) U.S. Cl.
  CPC .................. *F02C 3/04* (2013.01); *F02C 6/20* (2013.01); *F05D 2220/325* (2013.01)

(56) References Cited

U.S. PATENT DOCUMENTS

| | | | |
|---|---|---|---|
| 4,523,891 | A | 6/1985 | Schwartz et al. |
| 4,893,989 | A | 1/1990 | Carvalho |
| 5,186,608 | A | 2/1993 | Bagge |
| 6,811,376 | B2 | 11/2004 | Arel et al. |
| 7,841,831 | B2 | 11/2010 | Chen |
| 7,976,279 | B2 | 7/2011 | Raes et al. |
| 8,336,290 | B2 | 12/2012 | Glynn et al. |
| 8,439,640 | B2 * | 5/2013 | Arel ........................ B64C 11/38 416/117 |
| 9,284,042 | B2 * | 3/2016 | Couderc ................. B64C 11/38 |
| 2010/0310371 | A1 | 12/2010 | Eglin |
| 2011/0208400 | A1 | 8/2011 | Lickfold et al. |
| 2014/0193261 | A1 | 7/2014 | Frantz et al. |
| 2014/0205457 | A1 | 7/2014 | Curlier et al. |
| 2016/0244149 | A1 * | 8/2016 | Carrington ............ B64C 11/301 |

FOREIGN PATENT DOCUMENTS

| | | |
|---|---|---|
| GB | 2461784 A | 1/2010 |
| KR | 20120014347 A | 2/2012 |
| WO | 2015052459 A1 | 4/2015 |

OTHER PUBLICATIONS

Poland Search Report issued in connection with Related PL Application No. 413810 dated Nov. 15, 2016.

European Search Report & Opinion issued in connection with corresponding EP Application No. 16186944.1 dated Jan. 30, 2017.

GE Related Case Form.

\* cited by examiner

SYSTEM AND METHOD FOR CONTROLLING PROPELLER PITCH

FIELD OF THE INVENTION

The present subject matter relates generally to variable pitch control systems and methods for gas turbine engine propellers, and more particularly to systems and methods for limiting propeller pitch.

BACKGROUND OF THE INVENTION

Gas turbine engines generally include a core engine powering a turbine to rotate one or more fan or propeller blade. One type of gas turbine engine, known as an "open rotor" design, operates similarly to a conventional turbofan and turboprop designs, but with fuel efficiency that is superior to both. A turbofan engine operates on the principle that a central gas turbine core drives a bypass fan, the fan being located at a radial location between a nacelle of the engine and the engine core. However, in an open rotor design, a "bypass" propeller is mounted outside of an engine's nacelle. This permits the propeller to act on larger volumes of air and generate more thrust than with conventional turbofan engine. In some open rotor engines, the "bypass" propeller includes two counter-rotating rotor assemblies, each rotor assembly carrying an array of propeller blades located outside the engine nacelle.

A pitch control system may be attached to the propellers in order to alter the propellers' pitch angle according to desired flight characteristics. Optimum performance requires such systems to have a high-degree of accuracy. However, the desired pitch range may differ according to the ambient conditions or determined operation state. As a result, the pitch or pitch range which is suitable for one condition, may be wholly unsuitable for another. As a result, an ideal propeller pitch for one condition may lead to catastrophic failure in another. Existing systems often lack fail-safes or additional features that limit propeller pitch from inadvertently entering into a dangerous or non-ideal range.

Accordingly, improved pitch control systems and methods are desired. In particular, pitch control systems and methods for gas turbine engines that selectively limit the pitch angle may be beneficial.

BRIEF DESCRIPTION OF THE INVENTION

Aspects and advantages of the invention will be set forth in part in the following description, or may be obvious from the description, or may be learned through practice of the invention.

A propeller pitch control system and method is generally provided that limits a propeller pitch angle during selected modes of operation.

In accordance with one embodiment, a pitch system is provided that includes a fine stop collar extending along a central axis and defining a primary channel. The fine stop collar includes an outer face positioned about the primary channel and discrete first and second fluid passages extending through the outer face. Also included in the system is an oil transfer bearing (OTB) extending across the fine stop collar outer face and linearly translatable thereto. The OTB defines at least one radial stator hole that is in fluid communication with the first fluid passage during a ground-based mode of operation and in fluid communication with the second fluid passage during a flight-based mode of operation. Further included is an actuator piston engaged with a propeller blade crankshaft to vary propeller blade pitch. The annular piston is positioned about the OTB in fluid communication with the primary channel.

In accordance with another embodiment, a gas turbine engine is included. The gas turbine engine includes a core engine extending along a central axis, and at least one row of propeller blades mounted circumferentially about the central axis. At least one propeller blade and crankshaft are pivotable about a radial blade axis. Also included in the engine is a fine stop collar extending along a central axis and defining a primary channel. The fine stop collar includes an outer face positioned about the primary channel and discrete first and second fluid passages extending through the outer face. Also included in the system is an oil transfer bearing (OTB) extending across the fine stop collar outer face and linearly translatable thereto. The OTB defines at least one radial stator hole that is in fluid communication with the first fluid passage during a ground-based mode of operation and in fluid communication with the second fluid passage during a flight-based mode of operation. Further included is an actuator piston engaged with a propeller blade crankshaft to vary propeller blade pitch. The annular piston is positioned about the OTB in fluid communication with the primary channel.

In accordance with another embodiment, a method for controlling a pitch angle of a row of propeller blades is included. The propeller blades being mounted circumferentially about a central axis, including at least one propeller blade and crankshaft pivotable about a radial blade axis. The method includes the step of initiating a ground-based mode of operation or a flight-based operation for an actuator piston disposed annularly above an oil transfer bearing (OTB) and fine stop collar, the fine stop collar defining discrete first and second fluid passages. Also included are the steps of selecting a pitch-change function and conditionally responding according to the initiating step. On the condition that a ground-based mode of operation is initiated, the responding step includes separately transporting hydraulic fluid through the fine stop collar first fluid passage and through the OTB while restricting transportation of hydraulic fluid into the second fluid passage. On the condition that a flight-based mode of operation is initiated, the responding step includes separately transporting hydraulic fluid through the fine stop collar second fluid passage and through the OTB while restricting transportation of hydraulic fluid from the first fluid passage. Further included is the step of translating the OTB and the piston in concert along the central axis while transferring hydraulic fluid between a cylinder aft chamber and a primary channel of the fine stop collar. Still further included is the step of converting translation movement at the piston kinematically into a pivotal movement of the crankshaft about the radial blade axis.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. The specific embodiments discussed herein are merely illustrative of specific ways to make and use the invention and do not delimit the scope of the invention.

In order to aid understanding of this disclosure, several terms are defined below. The defined terms are understood to have meanings commonly recognized by persons of ordinary skill in the arts relevant to the present invention.

The terms "includes" and "including" are intended to be inclusive in a manner similar to the term "comprising." Similarly, the term "or" is generally intended to be inclusive (i.e., "A or B" is intended to mean "A or B or both"). The phrase "in one embodiment," does not necessarily refer to the same embodiment, although it may.

The terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Further, as used herein, the terms "axial" or "axially" refer to a dimension along a longitudinal axis of an engine. The terms "radial" or "radially" refer to a dimension extending between a center longitudinal axis of the engine and an outer engine circumference. The term "forward" used in conjunction with "axial" or "axially" refers to a direction toward the engine inlet, or a component being relatively closer to the engine inlet as compared to another component. The terms "rear" or "aft" used in conjunction with "axial" or "axially" refers to a direction toward the engine nozzle, or a component being relatively closer to the engine nozzle as compared to another component. Unless stated otherwise, the positional terms "above"/"below," "upward"/"downward," "outer"/"inner," and "outward"/"inward" refer to radial positioning and direction relative to the central axis.

The terms "controller," "control circuit," and "control circuitry" as used herein may refer to, be embodied by, or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Figure 1:
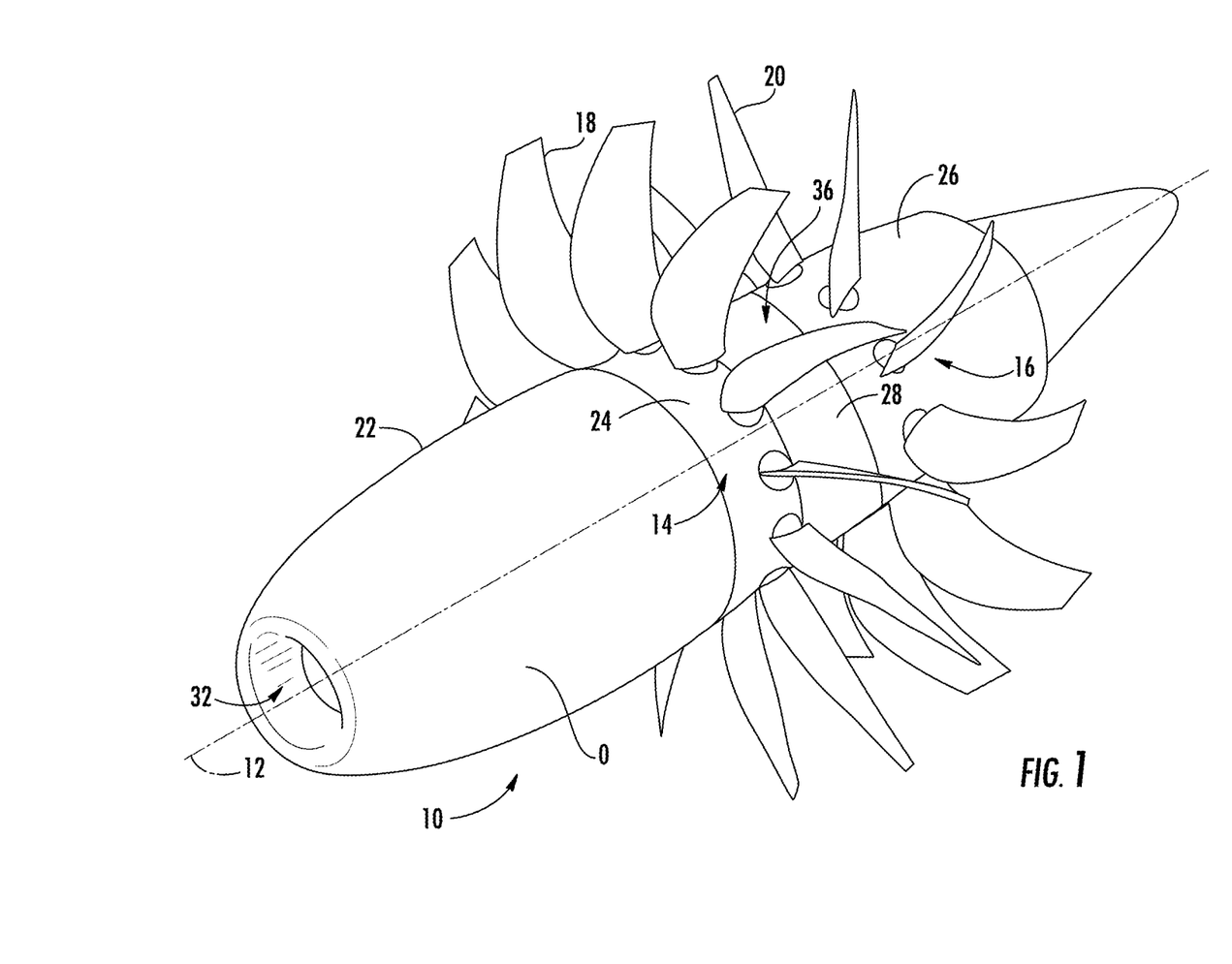
FIG. 1 is a perspective view of an open rotor counter rotational engine.

Referring now to the figures, FIG. 1 illustrates an exemplary open rotor gas turbine engine 10 defining a central axis 12. Positioned about the central axis 12 are multiple axially spaced apart counter-rotatable forward and aft annular rotor assemblies 14, 16. The assemblies 14, 16 include forward and aft propeller blades 18, 20 respectively that are disposed radially outwardly of an outer shroud or nacelle 22. The forward and aft annular rotor assemblies 14, 16 are illustrated herein as having twelve forward propellers 18 and ten aft propellers 20 but other numbers of propellers may be used. The nacelle 22 includes a forward fairing 24 which is coupled to and rotatable with the forward propellers 18 and an aft fairing 26 coupled to and rotatable with the aft propeller 20. The nacelle 22 further includes a spacer fairing 28 disposed between the forward and aft fairings 24, 26 and a nacelle nose 30 disposed radially outwardly of and surrounding a core engine 32. The nacelle nose 30 includes a nose inlet 34 that directs ambient air to the core engine 32. The nacelle 22 provides the proper airflow characteristics to optimize the performance of the propellers 18, 20.

Figure 2:
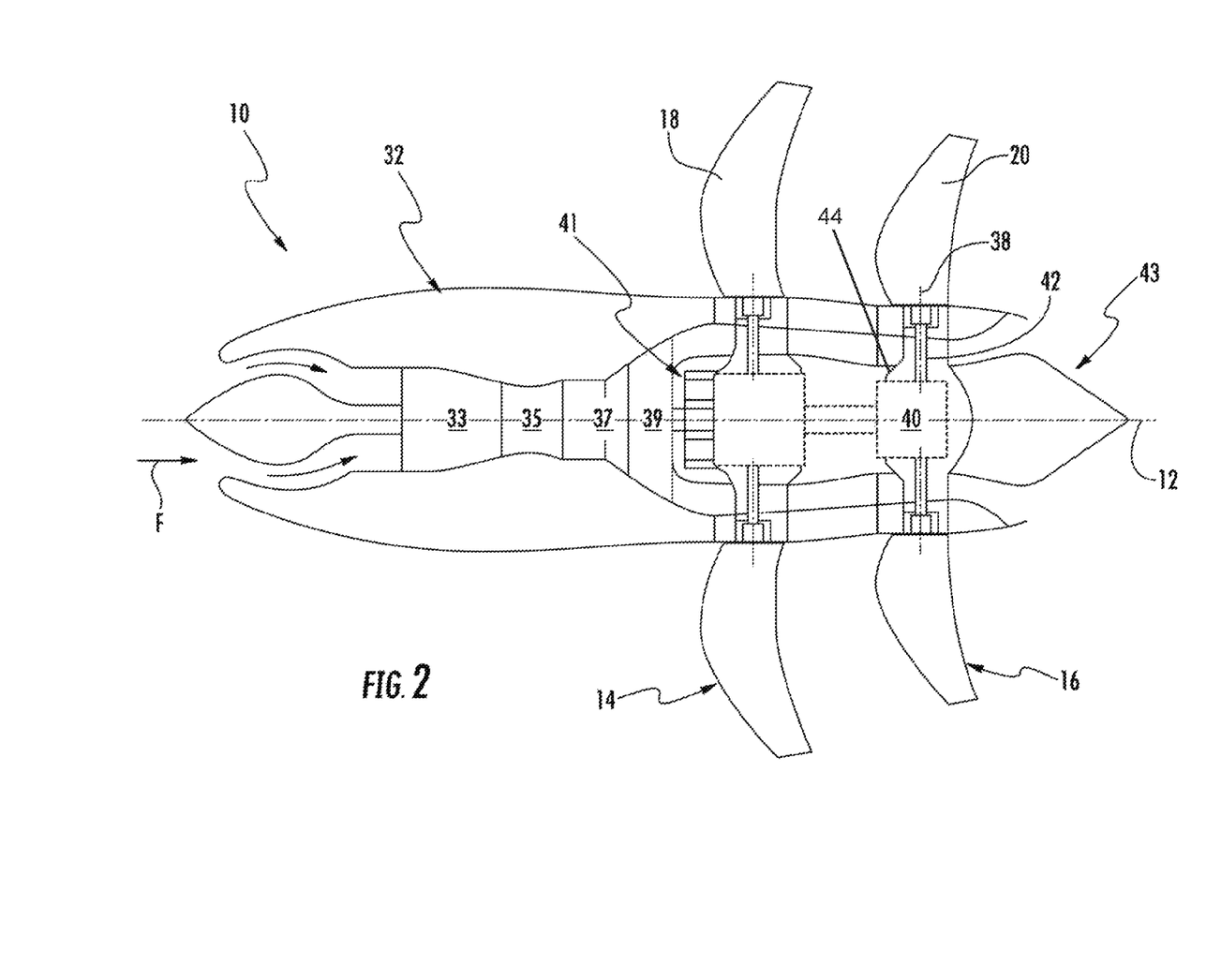
FIG. 2 is a schematic axial section view of an open rotor counter rotational engine embodiment.

The open rotor aircraft gas turbine engine 10 illustrated in FIGS. 1-2 is a pusher type engine having the spaced apart counter-rotatable forward and aft annular rotor assemblies 14, 16 of forward and aft propeller blades 18, 20 located generally at an aft end 36 of the engine and aft of the core engine 32 and the nacelle nose 30. The forward and aft annular rotor assemblies 14, 16 of the forward and aft propeller blades 18, 20 are a counter-rotating pusher type. Generally, the rotor assemblies 14, 16 are used to transfer thrust forces produced by the forward and aft propeller blades 18, 20 to an aircraft (not shown) and hence the designation pusher. Although a pusher system is described for illustrative purposes, it is envisioned that the claimed system would be equally applicable to puller systems—wherein propeller blades are positioned on a generally forward turbine frame to effectively "pull" an aircraft forward, as is known to those of ordinary skill in the art.

As illustrated in FIG. 2, the core engine 32 forms part of a gas turbine engine with one or more compressor 33, a combustor 35, and high and low pressure turbines 37, 39 in a downstream axial flow relationship F. The low and high pressure turbines 37, 39 are operably joined to the compressor 33 such that rotation of the turbines 37, 39 drives the compressor 33. In addition, the turbines 37, 39 are also operably joined to an epicyclical gearbox 41 which rotates the counter-rotating rotor assemblies 14, 16.

During operation, the flow of a compressible fluid (e.g., gas) stream F begins at the nacelle nose inlet 34. From there, the gas stream travels through the one or more compressors 33 before being ignited with a fuel at the annular combustor 35. The combustion rotates the high-pressure turbine 37 and the low-pressure turbine 39 before being expelled at the exhaust 43. Rotation of the turbines 37, 39 drives the gearbox 41 which then rotates the counter-rotating rotor assemblies 14, 16.

The propeller blades 18, 20 of the forward and aft propellers are of the variable setting angle type, i.e. they can be oriented about their respective radial pivot axes 38 by a pitch control system 40, so that the blades assume an optimal angular position according to the operating conditions of the engine and the relevant flight phases. The pitch control system 40 is attached to an inner frame 44 that remains static during rotation of the propeller blades 18, 20 and pitch adjustments thereto. In some embodiments, a blade support column 42 extends below the blades 18, 20 along the radial axis 38 and couples the blades 18, 20 to the pitch control system 40.

In the present description, only the system 40 for orienting blades associated with the aft rotor assembly 16 will be described. The forward rotor assembly 14, which is not shown in FIGS. 3-5, can be provided with a system for orienting blades that is similar or different to that described hereafter with reference to the aft rotor assembly 16.

Figure 3:
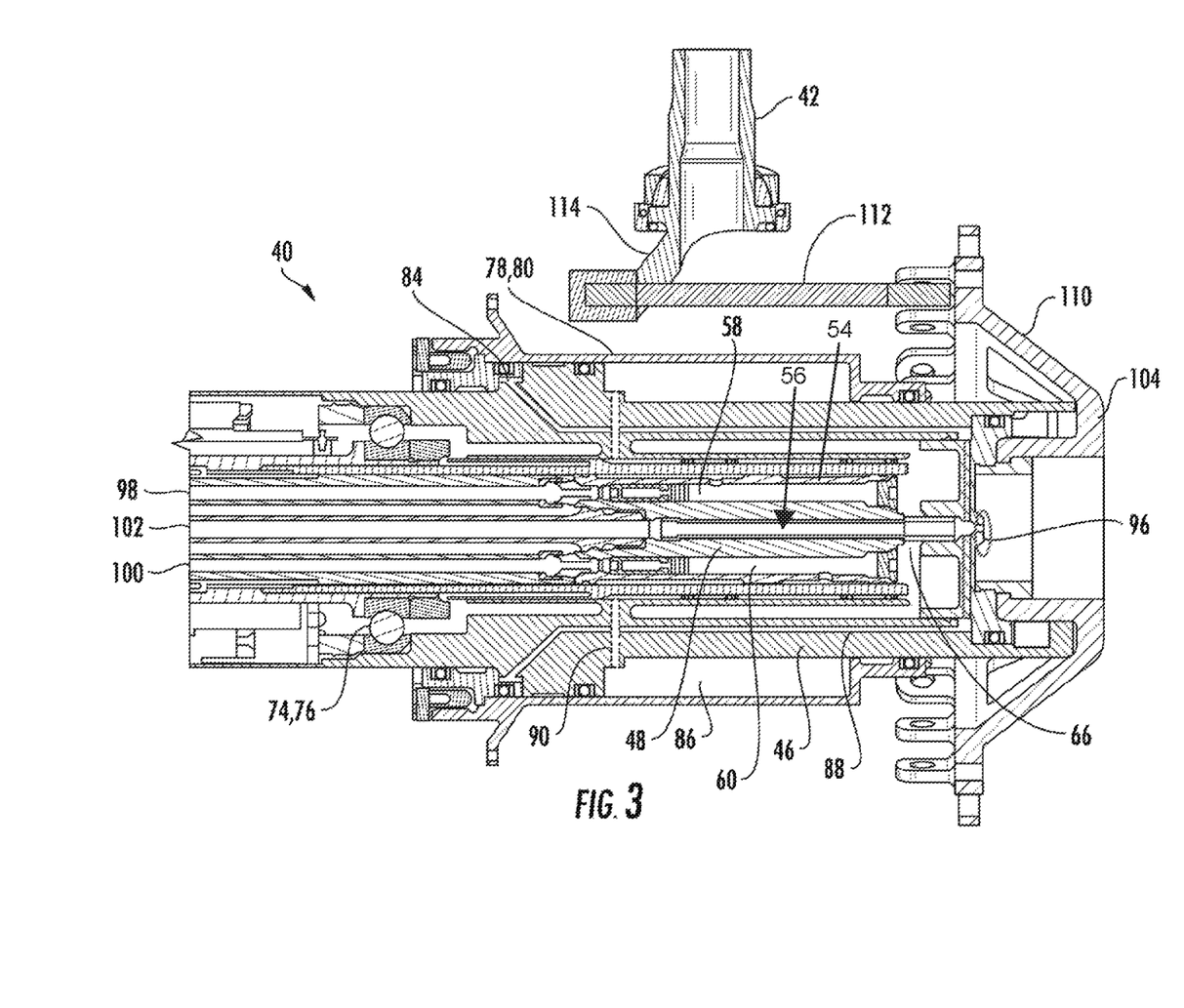
FIG. 3 is an axial view of an aft rotor pitch control system embodiment.
Figure 4:
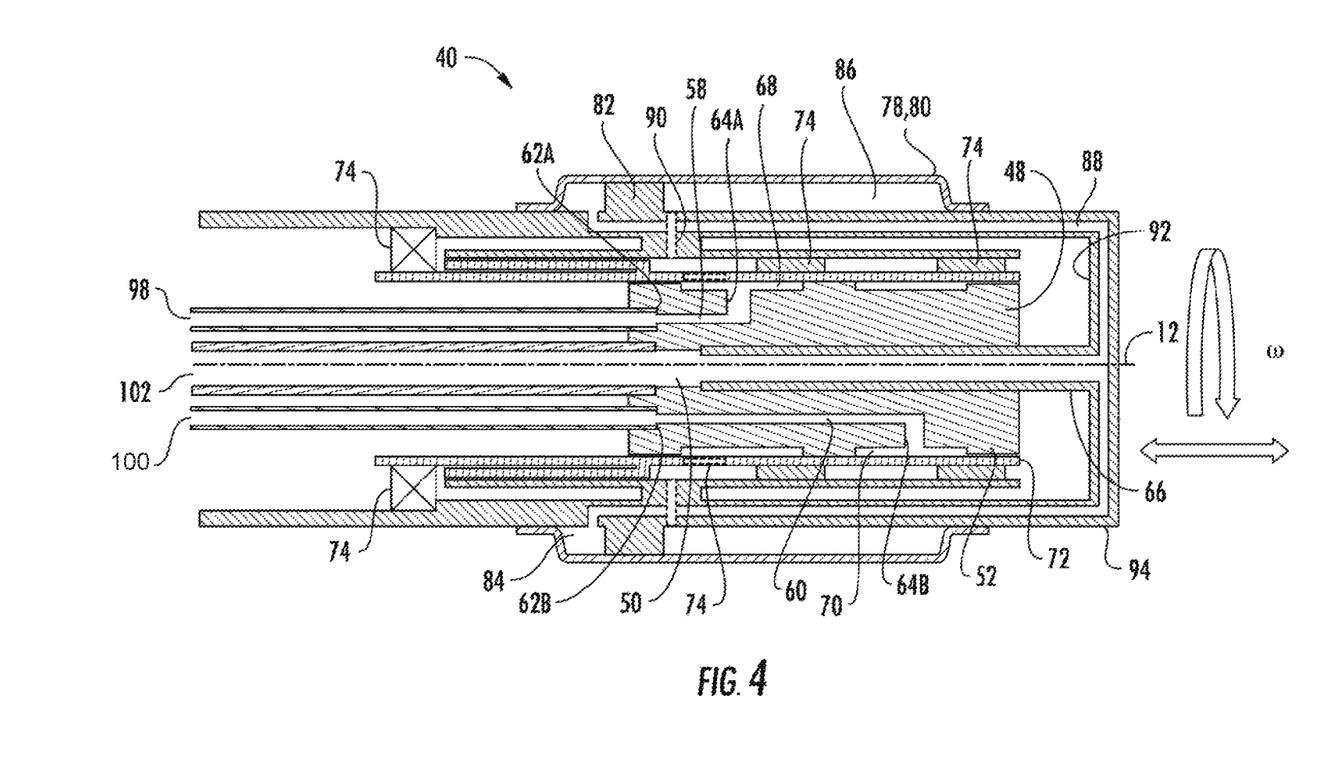
FIG. 4 is embodiment schematic axial view of the pitch control system embodiment of FIG. 3.
Figure 5:
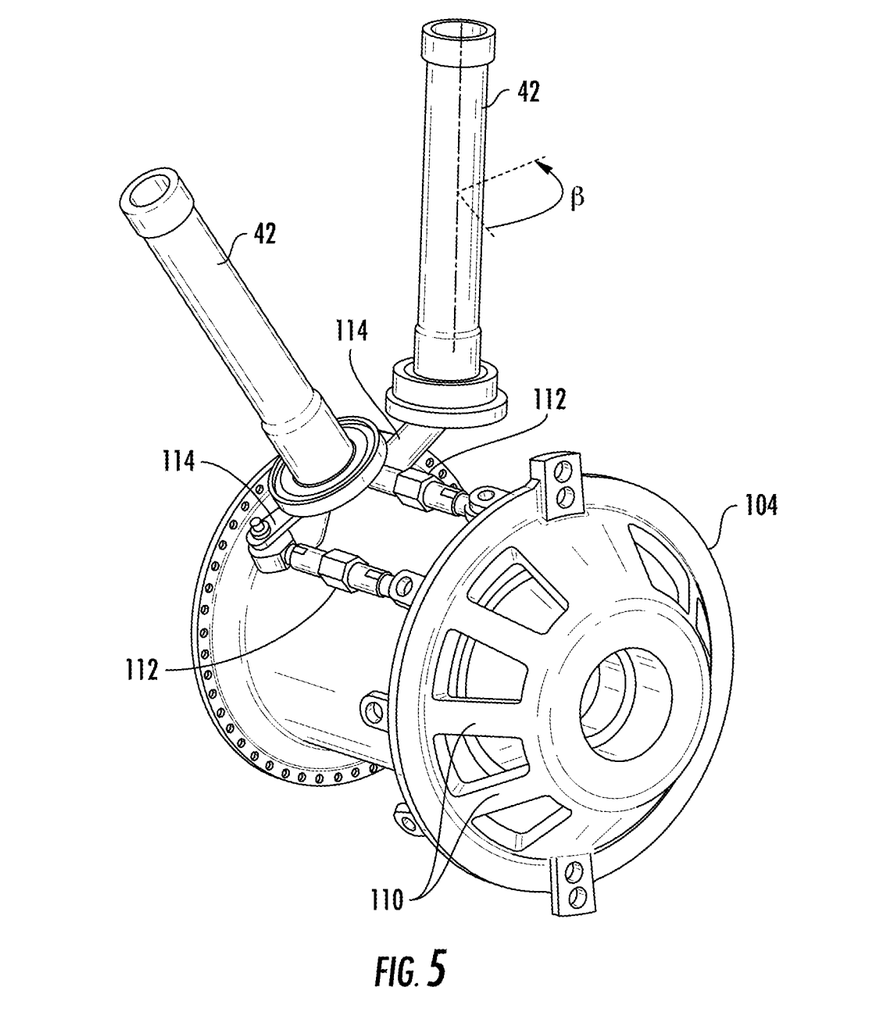
FIG. 5 is a perspective cut-away view of the embodiment of FIG. 3.

Turning to FIGS. 3-5, the pitch control system 40 comprises an actuator piston 46 that is positioned about the central axis 12 to translate forward and aft therealong. The system 40 is attached to the static frame 44 such that the piston 46 moves axially in relation to the static frame 44. Hydraulic fluid is supplied from a fluid reservoir (not shown) according to a selected operation mode in order to propel the piston 46 to a desired axial location relative to the static inner frame 44.

Disposed radially-inward from the piston 46 is a fine stop collar 48. The collar extends between oppositely disposed forward and aft ends 50, 52. In certain embodiments, at least one end is placed within the piston 46. In further embodiments, the fine stop collar 48 is translationally fixed and static to the inner frame 44. As a result, during pitch change operations, translation of the piston 46 is not imparted to the fine stop collar 48.

An outer face 54 of the collar is directed radially outward and extends between the collar's forward end 50 and aft end 52. Beneath the outer face 54, a primary channel 56 extends through collar 48 to fluidly communicate with the piston 46. In some embodiments, this communication occurs through a coarse rotatable pipe 66 that is joined to the piston 46 and rotatably attached to the fine stop collar 48. Optionally, the rotatable pipe 66 may be positioned at least partially within the primary channel 56 to direct fluid between the collar 48 and piston 46.

In the shown embodiments, the primary channel 56 is formed parallel to the outer face 54 and is positioned along the central axis 12. One or more fluid passages 58, 60 is defined through the outer face 54. During pitch change operations, the fluid passages 58, 60 may operably direct fluid from a forward end opening 62A, 62B to an outer face opening 64A, 64B. As illustrated, the outer face openings 64A, 64B of each passage 58, 60 are positioned in discrete separate axial locations. Any fluid disposed within one of the first and second passages 58, 60 may be isolated from (i.e., unmixed with) fluid disposed within the other passage and/or within the primary channel 56.

In additional embodiments, the fine stop collar outer face 54 includes discrete radial grooves 68, 70 axially-aligned above the outer face openings 64A, 64B. The grooves 68, 70 are optionally formed as annular bands having a predetermined width and depth about the outer face 54. Generally, the first groove 68 is formed parallel to the second groove 70. If the grooves 68, 70 are formed as integral recesses within the collar 48, a portion of the collar 48 may effectively separate fluid flow within the grooves 68, 70.

An oil transfer bearing (OTB) 72 is radially positioned between the collar 48 and piston 46 to extend across at least a portion of the fine stop collar outer face 54. The OTB 72 may be rotatably engaged with the collar 48 and rotationally fixed with respect to the piston 46. As a result, during pitch change operations, linear translation at the piston 46 is followed by similar linear translation at the OTB 72. During such movement, the collar 48 remains effectively static with respect to the inner frame 44. By contrast, translation of the piston 46 (and, by extension, the OTB 72) alters the piston's axial position relative to the static frame 44 and collar 48.

The OTB 72 of certain embodiments includes one or more stator holes 74 extending radially through the OTB 72. The radial holes 74 are optionally defined at multiple circumferential points to form an annular ring about the OTB 72. As the OTB 72 is translated along the central axis 12, the holes 74 separately align with the grooves 68, 70. Alignment with the grooves 68, 70 brings the holes 74 into fluid communication with the passageways 58, 60. As a result, the width of each groove 68, 70 effectively defines a discrete range of translation. Axial alignment with the first groove 68 brings the holes 74 into fluid communication with the first passageway 58 over a first range of translation. Axial alignment with the second groove 70 brings the holes 74 into fluid communication with the second passageway 60 over a second range of translation. Generally, the first range of translation is defined for a ground-based mode of operation while the second range of translation is defined for a flight-based mode of operation.

As shown in FIGS. 3-4, in some embodiments, one or more bearings 76 are radially disposed between the OTB 72 and piston 46. The bearings 76 may include an annular bearing ring, needle bearing, ball bearing, or other rotational bearing known to one of ordinary skill in the art. The bearings 76 maintain a predetermined distance between the OTB 72 and piston 46. Moreover, they permit rotation of the piston 46 about the translationally fixed OTB 72.

In certain embodiments, a cylinder 78 having an annular cylinder wall 80 is positioned circumferentially over at least a portion of the piston 46. In such embodiments, the piston 46 includes a flange 82 extending radially to engage the cylinder wall 80. The flange 82 defines two fluidly discrete chambers 84, 86 with the cylinder wall 80. When assembled, the flange 82 of certain embodiments engages the cylinder wall 80 and forms a slidable fluid seal between the forward chamber 84 and the aft chamber 86. Two piston ducts 88, 90 direct fluids to/from the chambers 84, 86. Generally, the piston 46 translates relative to the cylinder 78 during pitch change operations. In other words, the piston 46 may be considered slidably disposed within the cylinder 78.

The first piston duct 88 is formed through an inner piston wall 92 and an outer piston wall 94. The first piston duct 88 extends about the periphery of the piston 46 to fluidly connect the forward chamber 84 to the fine stop collar primary channel 56. In optional embodiments, the inner piston wall 92 is attached to the coarse rotatable pipe 66. Additional or alternative embodiments of the inner and outer wall 92, 94 include separable cap 96 disposed on the aft end of the piston. In such embodiments, the cap 96 can be secured to the coarse rotatable pipe 66, and direct fluid radially outward therefrom, before the fluid is directed axially to the forward chamber 84.

The second piston duct 90 includes one or more passageways extending radially through the inner piston wall 92 and the outer piston wall 94. The second piston duct 90 is formed aft of the flange 82 to fluidly communicate with the aft chamber 86. Moreover, the second piston duct 90 is axially aligned with the radial stator hole 74 of the OTB. As a result, the second piston duct 90 is also in selective fluid communication with the fine stop collar first and second passages 58, 60. At one or more predetermined position, fluid transferred to/from the first or second passage 58, 60 is permitted to flow through the second piston duct 90 from/to the cylinder's aft chamber 86.

As illustrated, one or more fluid inlet pipes direct hydraulic fluid to and from the fine stop collar passages 58, 60. In some embodiments, a ground fine inlet pipe 98 directs fluid to the first fluid passage 58, while a discrete flight fine inlet pipe 100 directs fluid to the second fluid passage 60. Moreover, in certain embodiments a coarse inlet pipe 102 may direct fluid into the primary channel 56 and the coarse rotatable pipe 66. In optional embodiments, the coarse inlet pipe 102 is fixed relative to both the static frame 44 and the fine stop collar 48. In such embodiments, the coarse inlet pipe 102 may extend coaxially into the primary channel 56 while restricting rotation of the fine stop collar 48 about the central axis 12.

As shown in FIGS. 3 and 5, some embodiments of the system 40 include a cross head 104 attached to the piston 46. Optionally, the cross head 104 is attached to the piston 46 to move therewith. The attachment may be formed by an integral connection (e.g., a welded bead or a monolithically conjoined body) or may be a selective connection permitting operable detachment and reattachment (e.g., threaded joint, bolt and nut, or other mechanical connection joint). When attached, translation of the piston 46 during pitch change operations similarly translates the cross head 104.

One or more fingers 110 extend radially outward from the piston 46 (i.e., to a position radially above the piston) and attach to one or more crank rods 112. Each crank rod 112 is pivotally attached to a propeller blade crankshaft 114. The crankshaft 114 is rotationally fixed relative to the support column 42. As a result, translation of crank rods 112 forces the crankshaft 114 to rotate the column 42 about the blade axis 38. Rotation of the crankshaft 114 about the blade axis 38 thereby changes blade pitch ($\beta$). During engine operation, rotation of the blades 20 also occurs about the central axis 12 ($\omega$). This rotation ($\omega$) of the propeller blades 20 about the central axis 12 simultaneously rotates the linked crank rods 112, cross head 104, and piston 46.

During a ground-based mode of operation, hydraulic fluid may be supplied by the ground fine inlet 98 and through the first fluid passage 58. The radial holes 74 direct the fluid through the OTB 72 and second piston duct 90 to the aft chamber 86. Simultaneously, fluid in the forward chamber 84 is forced through the first piston duct 88 and into the coarse rotatable pipe 66. After entering the coarse rotatable pipe 66, hydraulic fluid is able to pass into the coarse inlet pipe 102 before returning to the fluid supply.

During a flight-based mode of operation, hydraulic fluid may be supplied by the flight fine inlet 100 and through the second fluid passage 60. The radial holes 74 direct the fluid through the OTB 72 and the second piston duct 90 to the aft chamber 86. Simultaneously, fluid in the forward chamber 84 is forced through the first piston duct 88 and into the coarse rotatable pipe 66. After entering the coarse rotatable pipe 66, hydraulic fluid is able to pass into the coarse inlet pipe 102 before returning to the fluid supply.

Hydraulic pressure may operably limit the translation of the system 40. As a result, flow to or from the passages 58, 60 is selectively restricted in order to limit translation within the system 40 and subsequent changes to propeller pitch ($\beta$).

For the purposes of illustration, an exemplary method of operation for a pitch control system 40 embodiment is described below. Upon providing the above described system 40, a ground-based or flight-based mode of operation is selectively initiated at a system controller (not shown) and a desired pitch angle is determined. The pitch angle determination may include calculating a required pitch change and necessary piston translation position based on a first measured pitch position and/or first measured piston position.

According to which mode of operation is initiated, a pitch-change function is selected to direct hydraulic fluid through the system 40. The system 40 conditionally responds to direct hydraulic fluid therethrough.

On the condition that a ground-based mode of operation is initiated, hydraulic fluid is transported through the ground fine inlet 98 and the coarse inlet pipe 102. If the necessary piston translation position is axially rearward of the measured position, hydraulic fluid is transported through the ground fine inlet 98 to the first fluid passage 58 while fluid is simultaneously transported from the forward cylinder chamber 84 to the coarse rotatable pipe 66. If the necessary piston translation is axially forward of the measured position, hydraulic fluid is transported from the aft cylinder chamber 86 second piston duct 90 while fluid is simultaneously transported from the coarse inlet pipe 102 to the coarse rotatable pipe 66 and cylinder forward chamber 84. During the ground-based mode of operation, transportation of hydraulic fluid to the second fluid passage 60 is restricted and movement of the OTB radial holes 74 within the second fluid passage range of translation is prevented. A predetermined ground mode pressure is maintained in the second fluid passage 60.

On the condition that a flight-based mode of operation is initiated, hydraulic fluid is transported through the flight fine inlet 100 and the coarse inlet pipe 102. If the necessary piston translation position is axially rearward of the measured position, hydraulic fluid is transported through the flight fine inlet 100 to the second fluid passage 60 while fluid is simultaneously transported from the forward cylinder chamber 84 to the coarse rotatable pipe 66. If the necessary piston translation is axially forward of the measured position, hydraulic fluid is transported from the aft cylinder chamber 86 to first piston duct 88 while fluid is simultaneously transported from the coarse inlet pipe 102 to the coarse rotatable pipe 66 and cylinder forward chamber 84. During the flight-based mode of operation, transportation of hydraulic fluid from the first fluid passage 58 is restricted and movement of the OTB radial holes 74 within the first fluid passage range of translation is prevented. A predetermined flight mode pressure is maintained in the first fluid passage 58.

While fluid is transferred between the cylinder forward chamber 84 and the coarse rotatable pipe 66, the OTB 72, coarse rotatable pipe 66, and piston 46 are translated simultaneously in concert to meet the necessary piston translation position.

Translational movement at the piston 46 is transported to the crank rods 112 where it is converted kinematically into pivotal movement of the crankshafts 114 about the respective radial blades axes 38.

In some embodiments, the method further includes the step of rotating a row of propellers 18, 20 about the central axis 12. Also included is the step of rotating the coarse rotatable pipe 66, the cylinder 78, and the piston 46 about the central axis 12 in concert with the rotation of the propellers 18, 20 while the fine stop collar 48 and OTB 72 are maintained in a rotationally fixed position relative to the central axis 12.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A pitch change system, comprising:
   a fine stop collar extending along a central axis and defining a primary channel, the fine stop collar including an outer face positioned about the primary channel, the fine stop collar further defining discrete first and second fluid passages extending through the outer face;
   an oil transfer bearing (OTB) extending across the fine stop collar outer face and linearly translatable thereto, the OTB defining at least one radial stator hole, the at least one radial stator hole being in fluid communication with the first fluid passage during a ground-based mode of operation and in fluid communication with the second fluid passage during a flight-based mode of operation; and
   an actuator piston engaged with a propeller blade crankshaft to vary propeller blade pitch, the actuator piston being positioned about the OTB in fluid communication with the primary channel.

2. The pitch change system of claim 1, further comprising an actuator cylinder having a cylinder wall disposed about the piston and translationally static thereto.

3. The pitch change system of claim 2, wherein the piston further comprises a flange extending radially in engagement with the cylinder wall to fluidly separate a forward cylinder chamber and an aft cylinder chamber.

4. The pitch change system of claim 1, further comprising:
   at least one bearing radially positioned between the OTB and the piston, wherein the OTB is translationally fixed with respect to the piston, wherein the piston is simultaneously rotatable about to the central axis and linearly translatable in relation to the fine stop collar.

5. The pitch change system of claim 1, further comprising:
   a coarse inlet pipe attached to the fine stop collar in fluid communication with the primary channel to permit an exchange of hydraulic fluid therethrough.

6. The pitch change system of claim 5, further comprising:
   a ground fine inlet pipe translatably attached to the fine stop collar in fluid communication with the first fluid passage to permit an exchange of hydraulic fluid therethrough; and
   a flight fine inlet pipe translatably attached to the fine stop collar in fluid communication with the second fluid passage to permit an exchange of hydraulic fluid therethrough.

7. The pitch change system of claim 1, further comprising:
   a cross head attached to the piston and including at least one finger extending radially outward therefrom; and
   a crank rod extending longitudinally from the cross head finger, wherein the propeller blade crankshaft is pivotally joined to the crank rod to direct rotation of the propeller blade about a radial axis.

8. The pitch change system of claim 1, wherein the fine stop collar includes oppositely disposed forward and aft ends, and wherein the first fluid passage includes a forward end opening and an outer face opening, and further wherein the second fluid passage includes a forward end opening and an outer face opening axially spaced from the first fluid passage outer face opening.

9. The pitch change system of claim 8, wherein the fine stop collar outer face defines a first radial groove above the first fluid passage outer face opening and a second radial groove above the second fluid passage outer face opening.

10. The pitch change system of claim 1, where the at least one radial stator hole is a plurality of radial stator holes, wherein on the condition that the ground-based mode of operation is initiated, hydraulic fluid into the second fluid passage is restricted, and wherein on the condition that the flight-based mode of operation is initiated, hydraulic fluid into the first fluid passage is restricted.

11. A gas turbine engine, comprising:
    a core engine extending along a central axis;
    at least one row of propeller blades mounted circumferentially about the central axis, including at least one propeller blade and crankshaft pivotable about a radial blade axis;
    a fine stop collar extending along the central axis and defining a primary channel, the fine stop collar including an outer face positioned about the primary channel, the fine stop collar further defining discrete first and second fluid passages extending through the outer face;
    an oil transfer bearing (OTB) extending across the fine stop collar outer face and linearly translatable thereto, the OTB defining at least one radial stator hole, the at least one radial stator hole being in fluid communication with the first fluid passage during a ground-based mode of operation and in fluid communication with the second fluid passage during a flight-based mode of operation; and
    an actuator piston engaged with the at least one propeller blade crankshaft to vary propeller blade pitch, the actuator piston being positioned about the OTB in fluid communication with the primary channel.

12. The gas turbine engine of 11, further comprising an actuator cylinder having a cylinder wall disposed about the piston and translationally static thereto.

13. The gas turbine engine of 12, wherein the piston further comprises a flange extending radially in engagement with the cylinder wall to fluidly separate a forward cylinder chamber and an aft cylinder chamber.

14. The gas turbine engine of 11, further comprising at least one bearing radially positioned between the OTB and the piston, wherein the OTB is translationally fixed with respect to the piston, and further wherein the piston is simultaneously rotatable about to the central axis and linearly translatable in relation to the fine stop collar.

15. The gas turbine engine of 11, further comprising a coarse inlet pipe attached to the fine stop collar in fluid communication with the primary channel to permit passage of hydraulic fluid therethrough.

16. The gas turbine engine of 15, further comprising:
    a ground fine inlet pipe translatably attached to the fine stop collar in fluid communication with the first fluid passage to permit an exchange of hydraulic fluid therethrough; and
    a flight fine inlet pipe translatably attached to the fine stop collar in fluid communication with the second fluid passage to permit an exchange of hydraulic fluid therethrough.

17. The gas turbine engine of 11, further comprising:
    a cross head attached to the piston and including at least one finger extending radially outward therefrom; and
    a crank rod extending longitudinally from the cross head finger, wherein the propeller blade crankshaft is pivotally joined to the crank rod to direct rotation of the propeller blade about a radial axis.

18. The gas turbine engine of 11, wherein the fine stop collar includes oppositely disposed forward and aft ends, also wherein the first fluid passage includes a forward end opening and an outer face opening, and further wherein the second fluid passage includes a forward end opening and an outer face opening axially spaced from the first fluid passage outer face opening.

19. The gas turbine engine of 18, wherein the fine stop collar outer face defines a first radial groove above the first fluid passage outer face opening and a second radial groove above the second fluid passage outer face opening.

20. A method for controlling a pitch angle of a row of propeller blades mounted circumferentially about a central axis, including at least one propeller blade and a crankshaft pivotable about a radial blade axis, the method comprising the steps of:

initiating a ground-based mode of operation or a flight-based operation for an actuator piston disposed annularly above an oil transfer bearing (OTB) and a fine stop collar, the fine stop collar defining discrete first and second fluid passages;

selecting a pitch-change function;

conditionally responding to the selecting step according to the initiating step, including on the condition that the ground-based mode of operation is initiated, separately transporting a hydraulic fluid through the fine stop collar first fluid passage and through the OTB while restricting transportation of the hydraulic fluid into the second fluid passage, and on the condition that the flight-based mode of operation is initiated, separately transporting the hydraulic fluid through the fine stop collar second fluid passage and through the OTB while restricting transportation of the hydraulic fluid from the first fluid passage;

translating the OTB and the piston in concert along the central axis while transferring the hydraulic fluid between a cylinder forward chamber and a primary channel of the fine stop collar; and converting translation movement at the piston kinematically into a pivotal movement of the crankshaft about the radial blade axis.

\* \* \* \* \*